United States Patent [19]
Harasaki et al.

[11] 4,392,545
[45] Jul. 12, 1983

[54] ENGINE MOUNTING STRUCTURE FOR AN AUTOMOBILE BODY

[75] Inventors: Hayathugu Harasaki; Wataru Tsutagawa, both of Hiroshima, Japan

[73] Assignee: Toyo Kogyo Co., Ltd., Hiroshima, Japan

[21] Appl. No.: 252,594

[22] Filed: Apr. 9, 1981

[30] Foreign Application Priority Data

Apr. 12, 1980 [JP] Japan .............................. 55-49733[U]

[51] Int. Cl.³ ............................................. B62P 21/12
[52] U.S. Cl. .................................. 180/294; 180/54 F
[58] Field of Search ............... 180/299, 294, 297, 298, 180/54 F, 312

[56] References Cited

U.S. PATENT DOCUMENTS

| | | | |
|---|---|---|---|
| 773,480 | 10/1904 | Darnstaedt | 180/294 |
| 4,240,517 | 12/1980 | Harlow | 180/299 |
| 4,263,980 | 4/1981 | Harlow | 180/297 |

FOREIGN PATENT DOCUMENTS 51-156111 12/1976 Japan .

*Primary Examiner*—Robert R. Song
*Attorney, Agent, or Firm*—Fleit, Jacobson & Cohn

[57] ABSTRACT

An automobile body of a front-engine-front-drive type has an engine located in the engine compartment with the crankshaft directed transversely. The frame assembly for supporting the power unit comprising the engine and the transmission device is constituted by a front and rear sections. The rear section is secured to the body and the front section is removably connected at the front end with the body and at the rear end with the rear section. The power unit is mounted on the front section so that it can be removed from the body together with the front section.

9 Claims, 12 Drawing Figures

ENGINE MOUNTING STRUCTURE FOR AN AUTOMOBILE BODY

The present invention relates to an automobile body and more particularly to a front structure of an automobile body. More specifically, the present invention pertains to an engine mounting front structure of an automobile.

In an automobile of front-engine-front-drive type, a widely adopted arrangement has an engine mounted with its crankshaft extending transversely with respect to the longitudinal axis of the automobile body. The engine compartment for arranging the engine is generally defined by a rear wall provided by a dash panel, side walls provided by wheel aprons and side panels secured to side frame members, and a front wall provided by a front cross-member. For mounting the engine, there are generally provided longitudinal engine mounting frames which extend between the dash panel and the front cross-member. In conventional automobile bodies, the engine compartment thus defined is of a substantially rectangular configuration having a longitudinal dimension greater than a transverse dimension. Where the engine is arranged with its crankshaft transversely with respect to the longitudinal axis of the automobile body, it often happens that removal of the engine for inspection purpose is often disturbed by the body members. More specifically, the wheel aprons and the side frames secured thereto interfere with the engine when it is being taken out upwardly. On the other hand, the longitudinal engine mounting frames disturb downward removal of the engine.

In order to eliminate the above problem, Japanese utility model application 50-76645 filed on June 6, 1975 and disclosed on Dec. 13, 1976 for public inspection under the disclosure number of 51-156111 proposes a structure wherein a substantially rectangular frame is provided at the bottom portion of the engine compartment. According to the arrangement as proposed, the rectangular frame is connected removably at the front portion with the front cross-member of the body and at the rear portion with the reinforcement member in the lower portion of the dash panel. The frame member is adapted for mounting the engine and nothing is referred to with respect to the suspension arms of the suspension mechanisms. However, it is understood from the arrangement that the removable rectangular frame is the only member to which the parts of the body suspension mechanisms such as suspension arms can be attached. It should therefore be pointed out that in the structure as proposed by the Japanese utility model application the engine can be removed from the body by detaching the frame from the body, however, such removal of the engine can be performed only with a removal of the suspension parts.

It is therefore an object of the present invention to provide an engine mounting structure for an automobile in which removal and reinstallation of the engine can readily be performed.

Another object of the present invention is to provide an engine mounting structure in which the engine can be removed without disassembling or removal of the suspension mechanisms.

According to the present invention, the above and other objects can be accomplished by an automobile body including a front body section formed with an engine compartment, frame means provided in a lower portion of the engine compartment for mounting an engine, said frame means including a rear section secured to the body and extending forwardly into the engine compartment, and a front section having a front end portion removably attached through resilient means to the body and a rear end portion removably attached through second resilient means to the rear section, said engine being mounted on the front section of the frame means, suspension arms being swingably attached to the rear section, whereby said engine can be removed from the body together with the front section of the frame means. In one mode of the present invention, the front section of the frame means comprises a pair of longitudinal members and a transverse member having opposite ends secured to the longitudinal members. The engine has a crankshaft connected with power transmission device to constitute a power unit and may be arranged with the crankshaft transversely with respect to the body. The power unit may be mounted on the front section of the frame means through resilient means. The rear section may comprise a pair of longitudinal members having front ends adapted to be connected with rear ends of the longitudinal members of the front section.

In a preferable mode of the present invention, the front section of the frame means is attached at the front end portion to a lower surface of the body and at the rear end portion to a lower surface of the rear section of the frame means so that the front section can be removed downwardly. Where the front section of the frame means includes a pair of longitudinal members and a transverse member connecting the longitudinal members, it may be connected to the body at the front ends of the longitudinal members or at the transverse member. The engine or the power unit may be mounted on one of the longitudinal members and on the transverse member.

The above and other objects and features of the present invention will become apparent from the following descriptions of preferred embodiment taking reference to the accompanying drawings, in which.

Figure 1:
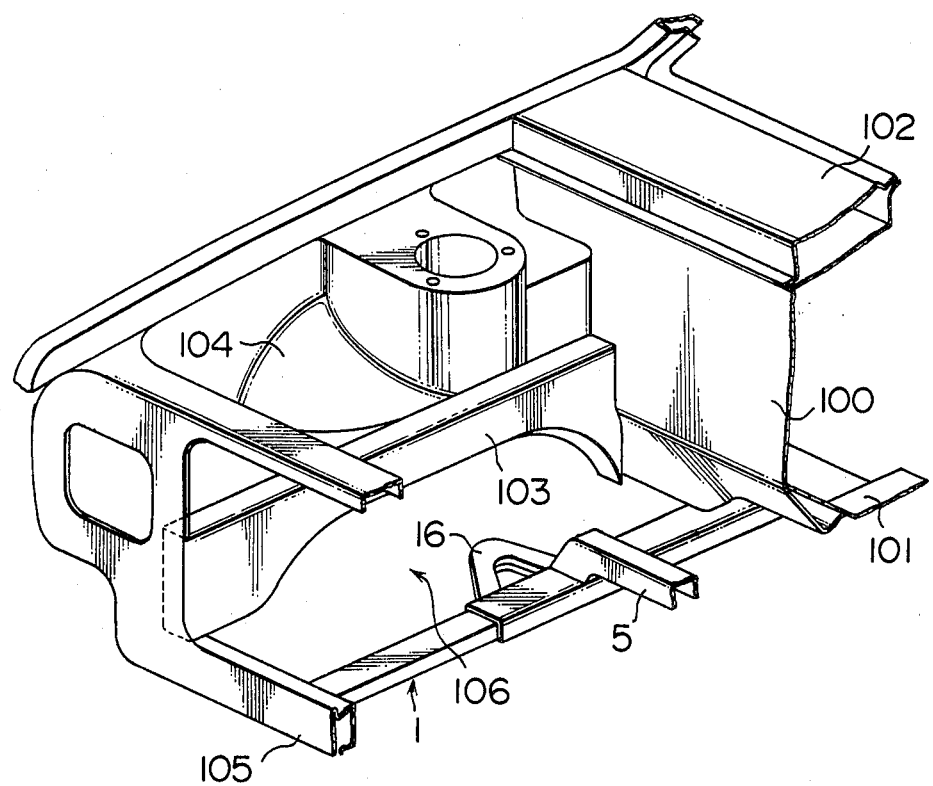
FIG. 1 is a fragmentary perspective view of an automobile body for showing the engine compartment.

Referring now to the drawings, particularly to FIG. 1, there is shown a front portion of an automobile body including a dash panel 100 connected at a lower end with a floor panel 101 and at an upper end with a cowl panel 102. At each side, the dash panel 100 is connected with a side frame 103 which extends forwardly from the dash panel 100. The side frame 103 is connected at the upper end with a wheel apron 104 and at the front end with one end of a front cross member 105 which extends transversely at the front end of the body. Thus, a substantially rectangular engine compartment 106 is defined at the front portion of the body.

Figure 2:
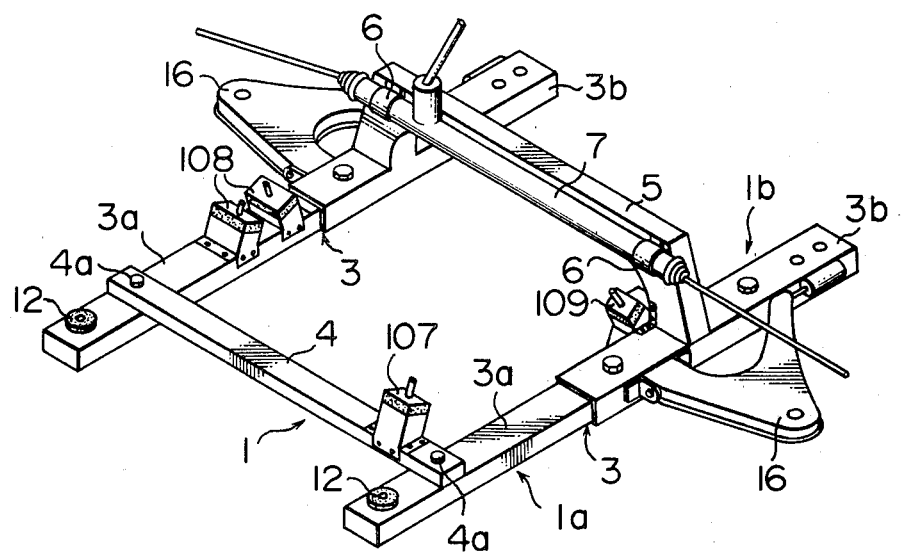
FIG. 2 is a perspective view of the engine mounting frame assembly in accordance with one embodiment of the present invention.
Figure 3:
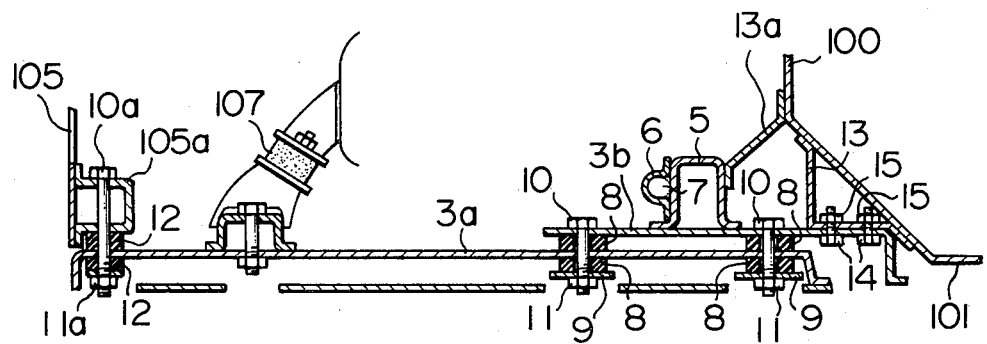
FIG. 3 is a longitudinal sectional view of the engine mounting frame assembly.

At the lower portion of the engine compartment 106, there is provided an engine mounting frame assembly 1. As shown in FIGS. 2 and 3, the frame assembly 1 comprises a front section 1a and a rear section 1b. The front section 1a includes a pair of longitudinal members 3a of closed cross-section and a transverse member 4 having opposite ends connected with the longitudinal members 3a by means of bolts 4a. The rear section 1b includes a pair of longitudinal members 3b and a transverse member 5 which is welded at the opposite ends to the longitudinal members 3b. As shown in FIG. 3, the longitudinal member 3b is connected at the rear end by means of bolts 14 and nuts 15 to a reinforcement cross member 13 which is welded to the lower end portion of the dash panel 100. The transverse member 5 is also connected to a reinforcement member 13a which is welded to the lower end of the dash panel 100. A rack-and-pinion type steering gear box 7 is mounted on the transverse member 5 by means of clamp members 6.

The longitudinal members 3b of the rear section 1b extend forwardly into the engine compartment 106 and are of a downwardly open cross-section. The longitudinal members 3a of the front section 1a are respectively fitted at the rear end portions thereof to the lower faces of the longitudinal members 3b of the rear section 1b through resilient rubber members 8. Connecting bolts 10 extend vertically through the rubber members 8 and the longitudinal members 3a and are engaged with nuts 11 with interventions of further resilient rubber members 8 and retaining plates 9 between the longitudinal members 3a and the nuts 11.

The front cross member 105 of the automobile body has a reinforcement member 105a which is welded to the cross member 105 and has a substantially rectangular cross-section. The front ends of the longitudinal members 3a are placed beneath the reinforcement member 105a with resilient rubber members 12 located therebetween. The front ends of the longitudinal members 3a are connected to the reinforcement member 105a by means of bolts 10a and units 11a.

Figure 4:
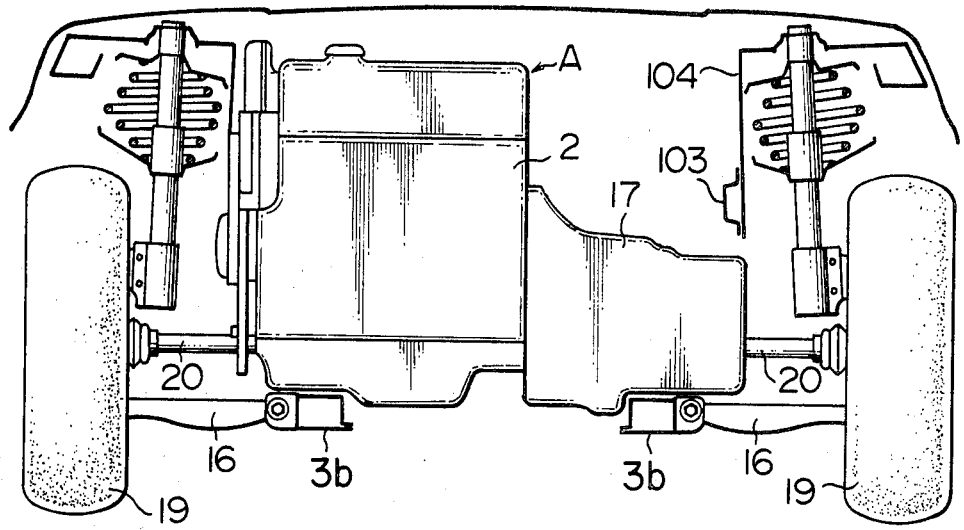
FIG. 4 is a front view showing the engine mounting and suspension mechanisms.
Figure 5:
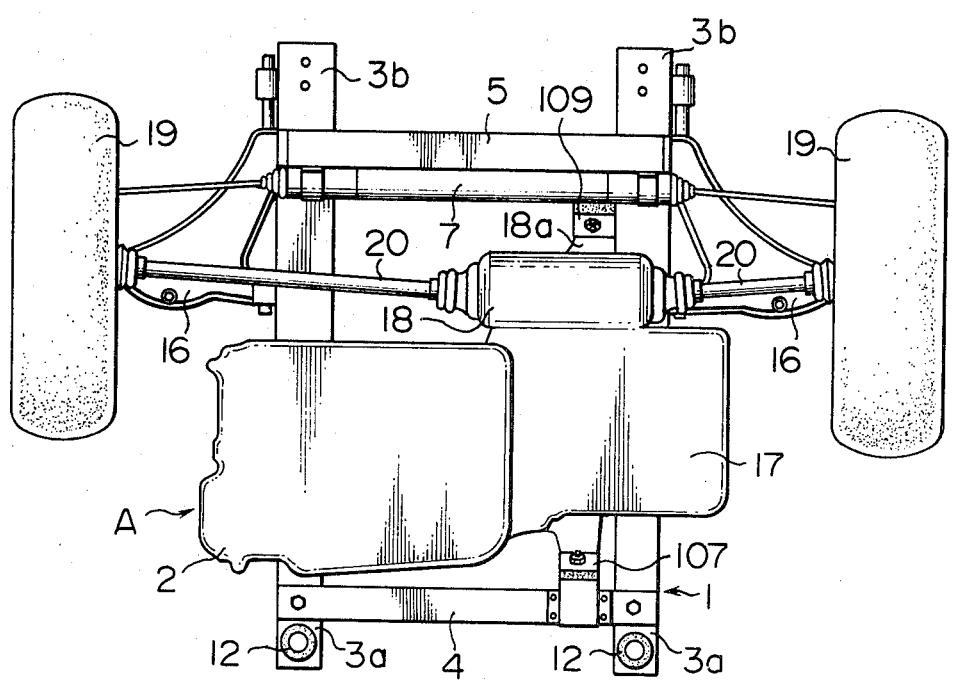
FIG. 5 is a top plan view of the mechanisms shown in FIG. 4.
Figure 6:
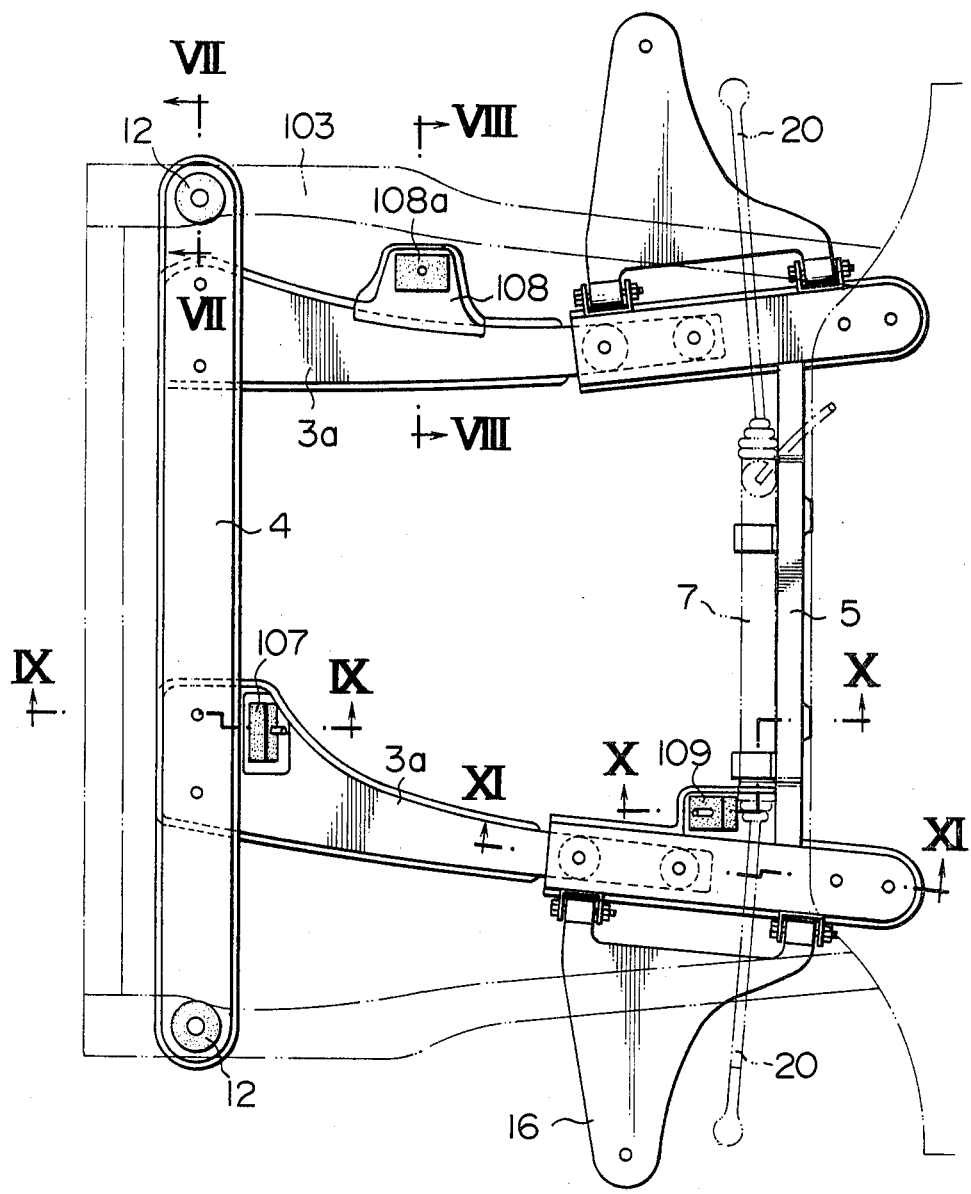
FIG. 6 is a plan view of the engine mounting frame assembly in accordance with another embodiment of the present invention.

Referring to FIGS. 4 and 5, it will be noted that a power unit A comprised of an engine 2 and a transmission device 17 is mounted on the frame assembly 1. Since the automobile is of a front-engine-front-drive type, a differential gear device 18 is provided at the rear side of the transmission device 17. The engine 2 is arranged with the crankshaft directed transversely. The transmission device 17 of the power unit A is mounted on the transverse member 4 of the frame assembly 1 through a resilient mounting unit 107. The engine 2 is mounted on one of the longitudinal members 3a through resilient mounting units 108 which are shown in FIG. 2. A resilient mounting unit 109 is provided to support the differential gear device 18 on the rear section 1b of the frame assembly 1. The mounting unit 109 projects transversely inwardly from one of the longitudinal members 3b of the rear section 1b so that a cooperating mounting bracket 18a on the differential gear device 18 does not interfere with the longitudinal member 3b when the differential gear device 18 is to be removed downwardly together with the engine 2 and the transmission device 17.

As shown in FIG. 2, each of the longitudinal members 3b of the rear section 1b is mounted with a suspension arm 16 which extends transversely outwardly and is swingable about a substantially longitudinally extending axis. Rubber tired wheel assemblies 19 are provided at the opposite sides of the frame assembly 1 and drivingly connected with drive shafts 20 which extend from the differential gear device 18.

In the arrangement described above, when it is desired to remove the engine 2 and the transmission device 17 together with the differential gear device 18, the differential gear device 18 is at first disconnected from the mounting unit 109. The front section 1a of the frame assembly 1 is then disconnected from the body and the rear section 1b by removing the bolts 10. The body is then lifted by means of a suitable lift, and the engine 2, the transmission 17 and the differential gear device 18 on the front section 1a are thus removed from the body. Alternatively, the body may in advance be lifted and the front section 1a of the frame assembly 1 is lowered together with the parts thereon. Where the power unit A includes a clutch assembly provided between the engine 2 and the transmission device 17, it is often desired to remove the power unit A for the purpose of replacing the clutch assembly. The arrangement described above is very convenient for such removal of the power unit even in front-engine-front-drive type automobile having an engine arranged with the crankshaft transversely. It is not required to disconnect any suspension parts for removing the power unit.

Figure 7:
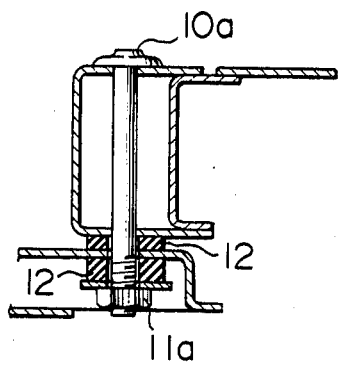
FIG. 7 is a sectional view taken along the line VII—VII in FIG. 6.
Figure 8:
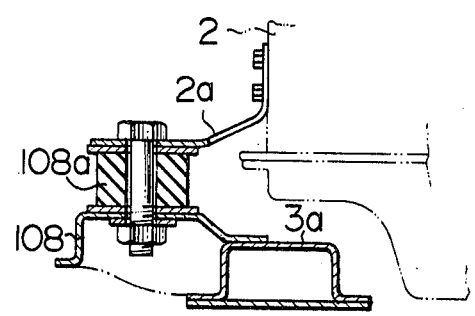
FIG. 8 is a sectional view taken along the line VIII—VIII in FIG. 6.

Referring now to FIGS. 6 through 12, the embodiment shown therein is substantially the same as the previous embodiment so that corresponding parts are designated by the same reference numerals. In this embodiment, the longitudinal members 3a of the front section 1a of the frame assembly 1 are secured to the transverse member 4 which has opposite ends located below and connected with the side frames 103 of the body through resilient rubber members 12 by means of connecting bolts 10a and nuts 11a as shown in FIG. 7. The right side one of the longitudinal members 3a of the front section 1a has an engine mounting bracket 108 having a mount rubber 108a on which the engine 2 is mounted through a bracket 2a on the engine 2 as shown in FIG. 8.

Figure 9:
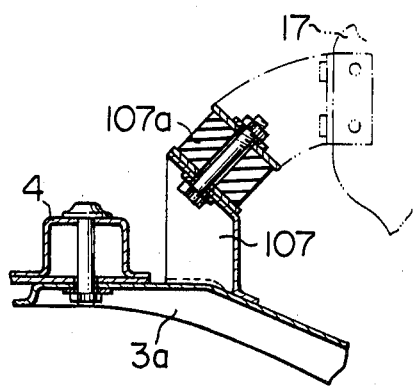
FIG. 9 is a sectional view taken along the line IX—IX in FIG. 6.
Figure 10:
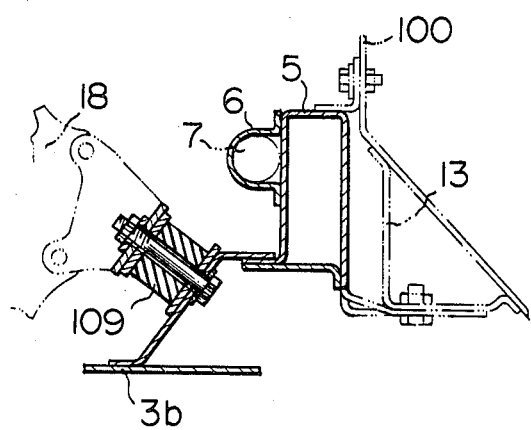
FIG. 10 is a sectional view taken along the line X—X in FIG. 6.
Figure 11:
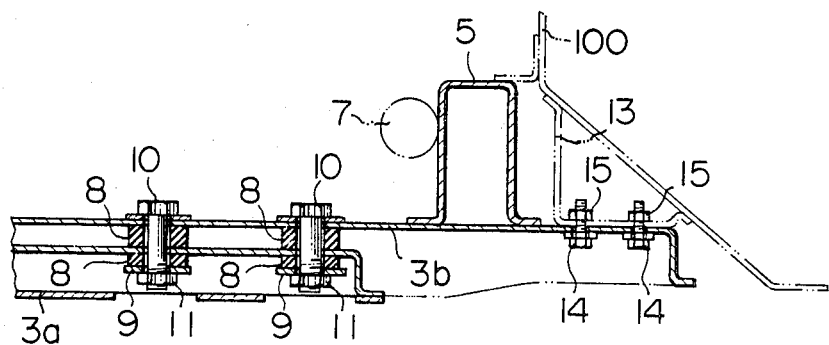
FIG. 11 is a sectional view taken along the line XI—XI in FIG. 6.
Figure 12:
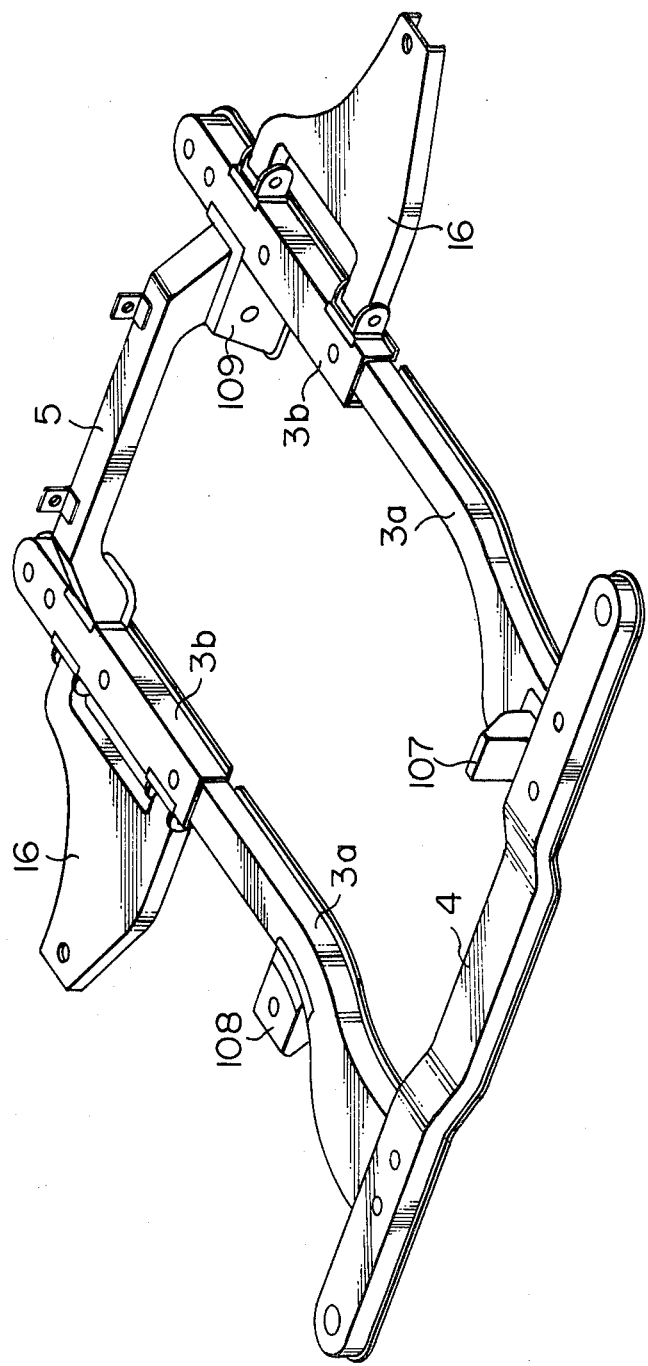
FIG. 12 is a perspective view of the engine mounting frame assembly shown in FIG. 6.

The left side one of the longitudinal members 3a of the front section 1a is provided at its front end portion with a transmission mounting bracket 107 having a mount rubber 107a. The transmission 17 is thus supported at the front side by the mounting bracket 107 as shown in FIG. 9. The left side one of the longitudinal members 3b of the rear section 1b is provided with a rubber mount 109 for supporting the differential gear device 18 as shown in FIG. 10. In this arrangement, it is possible to remove only the transmission 17 and the differential gear device 18. For the purpose, the transmission 17 is in advance disconnected from the engine 2, and then the gear device 18 from the rubber mount 109 and the left side longitudinal member 3a from the member 3b and from the transverse member 4. It is of course possible to disconnect the front section 1a of the frame assembly 1 from the rear section 1b to remove the power unit A as a whole as in the previous embodiment. The embodiment shown in FIG. 6 through 12 is considered as advantageous from the viewpoint of structural strength because the body side frames are stronger than the front cross member.

The invention has thus been shown and described with reference to specific embodiments, however, it should be noted that the invention is in no way limited to the details of the illustrated structures but changes and modifications may be made without departing from the scope of the appended claims.

We claim:

1. An automobile body including a front body section formed with an engine compartment, frame means provided in a lower portion of the engine compartment for mounting an engine, said frame means including a rear section secured to the body and extending forwardly into the engine compartment, and a front section having a front end portion removably attached through resilient means to the body and a rear end portion removably attached through second resilient means to the rear section, said engine being mounted on the front section of the frame means, suspension arms being swingably attached to the rear section, whereby said engine can be removed from the body together with the front section of the frame means.

2. An automobile body in accordance with claim 1 in which the front section of the frame means comprises a pair of longitudinal members and a transverse member having opposite end portions secured to the longitudinal members and the rear section comprises a pair of longitudinal members having front ends adapted to be connected with rear ends of the longitudinal members of the front section.

3. An automobile body in accordance with claim 2 in which said longitudinal members in the front section are connected with the longitudinal members in the rear section of the frame means.

4. An automobile body in accordance with claim 2 in which said rear section of the frame means includes a transverse member for connecting the longitudinal members of the rear section, a steering gear box being mounted on the transverse member of the rear section.

5. An automobile body in accordance with claim 1 in which the front section of the frame means is attached at the front end portion to a lower surface of the body and at the rear end portion to a lower surface of the rear section of the frame means so that the front section can be removed downwardly.

6. An automobile body in accordance with claim 2 in which said longitudinal members of the front section are connected to the body at a front cross member thereof.

7. An automobile body in accordance with claim 2 in which said transverse member of the front section has opposite ends connected with the body at front side members of the body.

8. An automobile body in accordance with claim 6 in which said engine is connected with transmission means to constitute a power unit, said transverse member of the front section being provided at least one mounting device for mounting the power unit.

9. An automobile body in accordance with claim 7 in which said engine is connected with transmission means to constitute a power unit, said front section of the frame means having mounting means for the power unit only on said longitudinal members.

* * * * *